May 19, 1970 J. BAER 3,513,264

CONTROLLED RANDOM MULTIPLE ACCESS COMMUNICATION SYSTEM

Filed May 13, 1966 2 Sheets-Sheet 1

INVENTOR.
JOSEPH BAER

BY Noel B. Hammond

AGENT.

CONTROLLED RANDOM MULTIPLE ACCESS COMMUNICATION SYSTEM

Filed May 13, 1966

2 Sheets-Sheet 2

INVENTOR
JOSEPH BAER
BY Noel B. Hammond
AGENT

United States Patent Office 3,513,264
Patented May 19, 1970

3,513,264
CONTROLLED RANDOM MULTIPLE ACCESS COMMUNICATION SYSTEM

Joseph Baer, Los Angeles, Calif., assignor to Hughes Aircraft Company, Culver City, Calif., a corporation of Delaware Filed May 13, 1966, Ser. No. 550,054
Int. Cl. H04j 3/06; H04m 7/00
U.S. Cl. 179—41 14 Claims

ABSTRACT OF THE DISCLOSURE

In a multichannel communication system, a station desiring to communicate with another station is assigned a transmit channel and a receive channel by a routing center that permits random multiple access to the channels while preventing mutual interference due to several stations attempting to operate on the same channel. The routing center monitors the status of the channels, and also provides billing information.

This invention relates to communication systems, and more particularly to a novel, controlled random multiple access communication system to be incorporated in, and which is compatible with, existing telephone systems.

Considerable time, effort and expense have been devoted to developing communication-satellite systems which provide random multiple access by all stations served by a satellite. In a random multiple access system, any station may transmit or receive on any channel, and the assignment of channels between stations is not fixed, but may vary from call to call in accordance with the demand for and availability of channels.

Unfortunately, due to transmission delays, such systems as heretofore known are unable to prevent occasional mutually interferring transmissions on a single channel by two or more stations. For example, one station may determine that a given channel is not in use, at a time after which another station has already seized the channel but before the total amount of transmission delay involved would so indicate. Both stations then transmit on the doubly-seized channel, with obvious undesirable results.

It is an object of my invention to provide a controlled random multiple access communication system in which the use of channels by various participating stations is controlled so there can be no double seizure of any channel.

It is another object of my invention to provide a novel controlled random multiple access communication system for use in satellite or all-terrestrial communication systems.

It is also an object of my invention to provide a novel controlled random multiple access telecommunication system of simple design capable of automatically establishing communication between subscribers without requiring any change in existing telephone equipment or established operating procedures.

Figure 1:
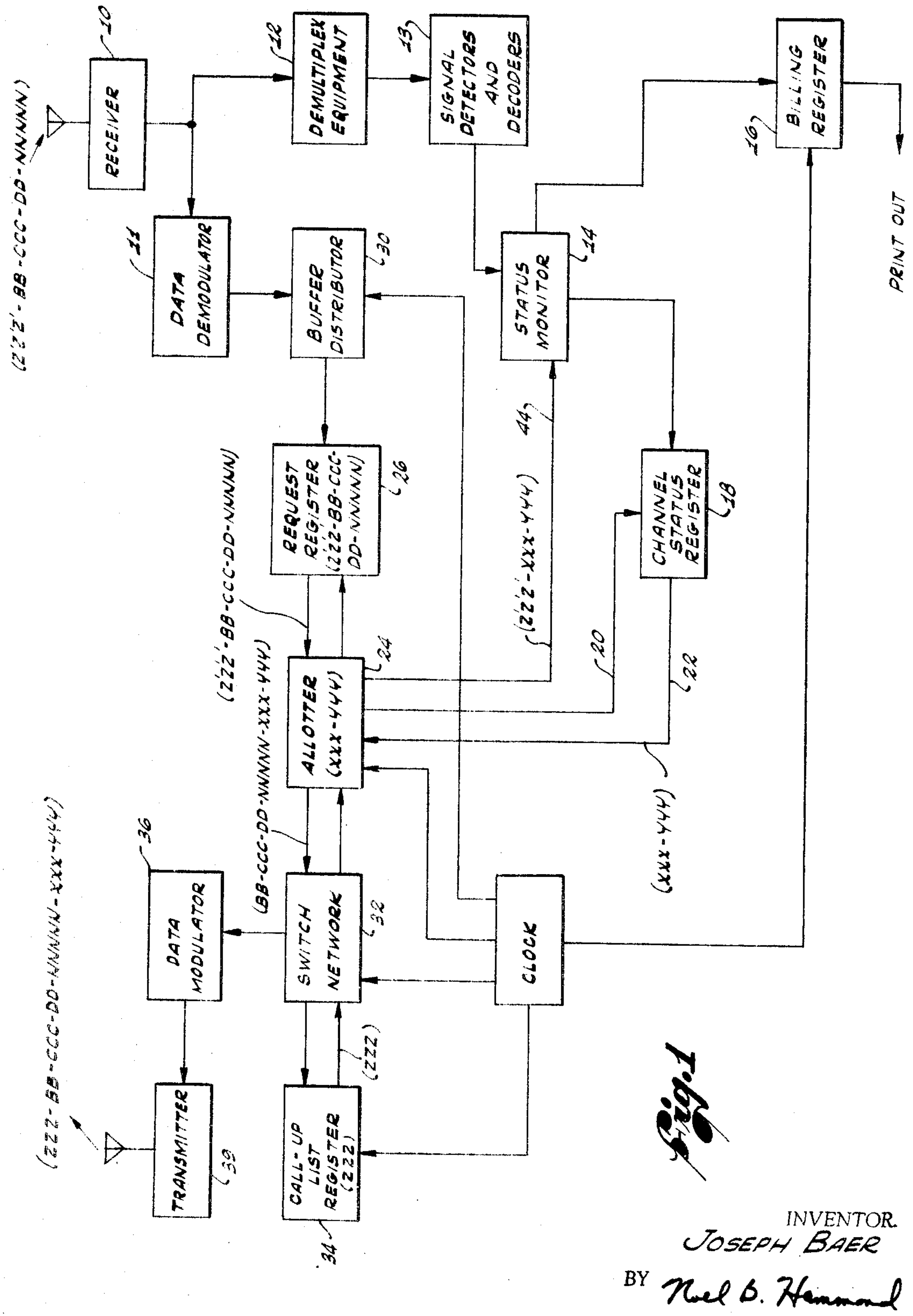
Figure 2:
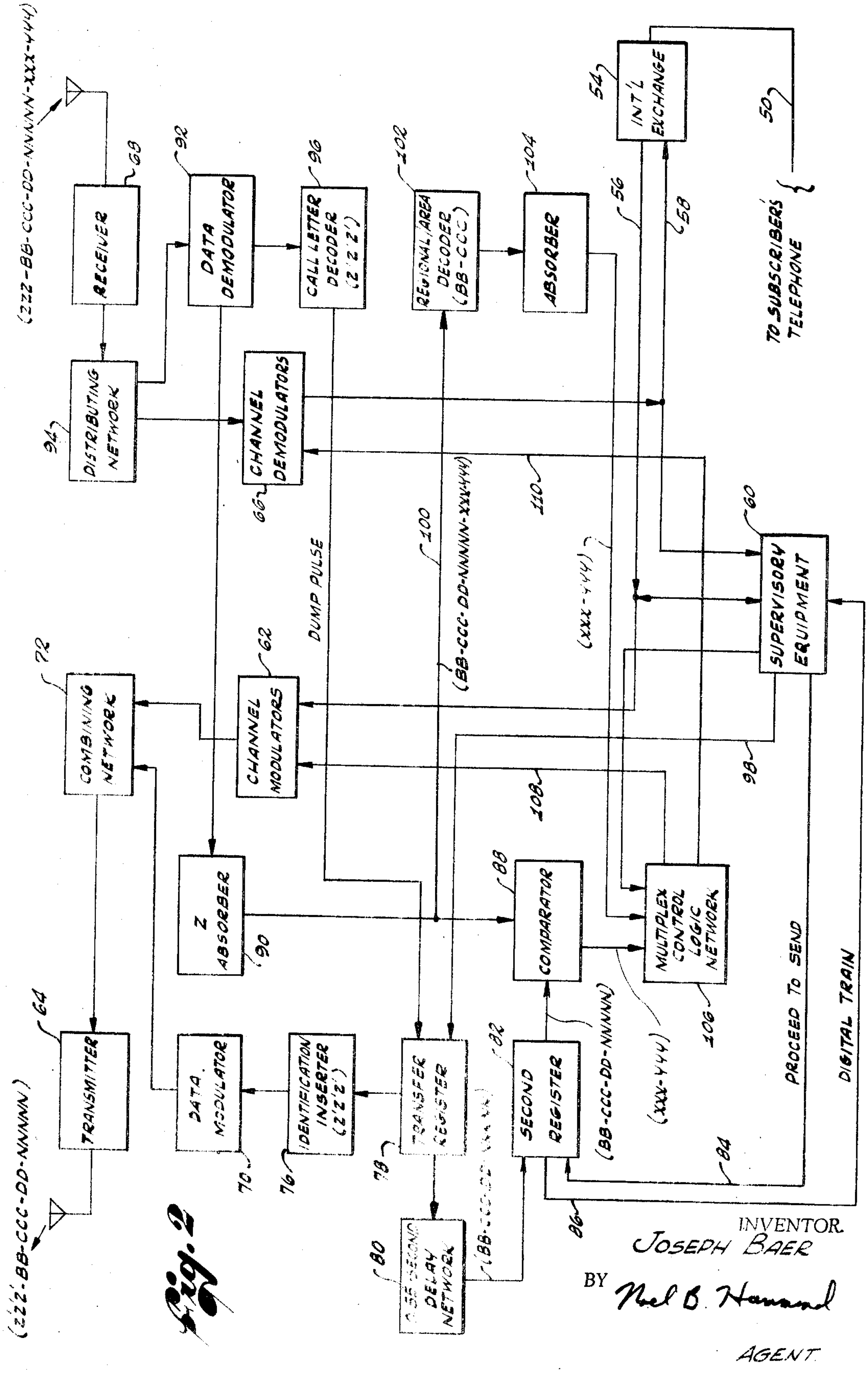

The above and other objects and advantages of my invention will become apparent from the following description taken in conjunction wtih the accompanying drawings of an illustrative embodiment thereof, in which:

FIG. 1 is a block diagram of the routing center of the system of my invention, through which requests for an assignment of channels for calls between different stations are routed; and FIG. 2 is a block diagram of the portion of the system of my invention that is provided for each individual station in a network.

The invention will be described with reference to an arbitrary symbolic code for use in identifying individual stations, regions (countries), areas, exchanges, and telephone numbers. The symbolic code selected for use in describing the invention is:

ZZZ–BB–CCC–DD–NNNNN in which

ZZZ is in the position for call letters of stations
BB represents the regional code
CCC represents the area code
DD represents the exchange in an area
NNNNN represents the number of the party being called.

In addition to the foregoing, the call letters for a particular station will be designated by

Z'Z'Z'

Further, transmission and receiving channels will be designated as

XXX–YYY so that for two-way communication, one station transmits over one channel, e.g., XXX, and receives over the other channel, YYY, and the other station transmits over channel YYY, and receives over channel XXX.

Briefly, in the operation of the system of my invention, a subscriber or operator served by an originating area station dials the portion of the diode following the call letters, i.e.,

BB–CCC–DD–NNNNN

These dialing pulses are fed into routing equipment of the originating station, for transmission to a routing center. The routing center interrogates the originating station periodically, and upon receipt of its call letters, routing equipment for the originating station inserts the station's call letters, i.e., Z'Z'Z', ahead of the dialing pulses. Thus, the routing center receives the signal

Z'Z'Z'–BB–CCC–DD–NNNNN

The routing center responds to these signals from the originating station to send out instructions which allot channels for transmission and reception for the calling subscriber's station and the station of the party being called, i.e., the addressed station. Thereafter, switching and communication between the parties may proceed as previously indicated, wherein the originating station transmits on channel XXX, and the addressed station transmits on channel YYY.

Routing center

Referring to FIG. 1, signals from a satellite repeater (not shown) arrive at a receiver 10. These are a composite of signals from all participating stations, which may be multiplexed by frequency-division, time-division, or in any other suitable manner. The receiver is connected to a data demodulator 11 and to demultiplex equipment 12.

The demultiplex equipment 12, which may be conventional telephone carrier equipment or radio frequency carrier equipment, is connected to signal detectors and decoders, indicated at 13, which may be conventional signaling receivers used by the telephone industry. The output of the network 13 is applied to a status monitor 14, for which a conventional computer register is suitable.

The status monitor 14 is connected to billing registers 16 for printing out information of charges for satellite terminals on the basis of duration of conversation. The status monitor 14 is also connected to a channel status register 18, which is interconnected at 20, 22 with a logic network, indicated as an allotter 24. The allotter 24 is coupled to the output of a request register 26, which is a register that stores digits and releases them on demand. The request register 26 has its input coupled to the data demodulator 11 through a buffer distributor 30, which may be a shift register.

A switch network 32 is connected between the allotter 24 and a call-up register 34, and alternately connects these networks to a data modulator 36 in accordance with the clock cycle of a clock 38, which may be a conventional digital clock. The call-up list register 34 is a conventional register in which the call letters ZZZ for all participating stations are stored. The call-up list register is continuously cycled, whereby the call letters for each station are periodically transmitted, via the data modulator 36 and the transmitter 39 modulated thereby.

Routing center synchronization and control is effected through the clock 38. As shown, the clock 38, in addition to being coupled to the call-up list register 34 and the switch network 32, is coupled to the allotter 24, the buffer distributor 30, and the billing registers 16.

Operation of routing center

Let it be assumed that a call has been initiated from a participating station, and that the particular letters Z′Z′Z′ are transmitted from that station along with the digital data representing the regional code, area code, exchange identifying code, and the number of the subscriber being called. In such case, the signal at the input to the data demodulator 11 includes:

Z′Z′Z′–BB–CCC–DD–NNNNN

This digital information is stored in the buffer distributor 30. The buffer distributor is triggered by the clock 38, and transfers the information to the request register 26. Then the allotter 24 is triggered by the clock, whereupon the information in the request register 26 is placed in the allotter 24.

When triggered, the allotter 24 effectively interrogates the channel status register 18 (at 20), and receives therefrom (at 22) the information that channels XXX–YYY are presently available channels for a conversion. The allotter 24, which is also coupled at 44 to the status monitor 14, transmits to the status monitor the digial information, XXX–YYY, preceded by the call letters Z′Z′Z′ of the originating station.

The channels XXX–YYY are now seized, and the status monitor 14 operates the channel status register 18 so that, for the duration of the conversation, it will be prevented from indicating that channels XXX–YYY are available for any other conversation.

There is now available in the allotter 24 the information:

BB–CCC–DD–NNNNN–XXX–YYY

At the appropriate time when the clock 38 triggers the switch network 32, the switch connects the call-up list register 34 to the data modulator 36, and then connects the allotter 24 to the data modulator. There is thus transmitter 39 a signal including the digital information

ZZZ–BB–CCC–DD–NNNNN–XXX–YYY

While this information is transmitted to all stations, only two stations identify it. Besides the originating station, which identifies its own call letters, Z′Z′Z′, the addressed station identifies its own regional and area codes. Thus, the routing center transmits instructions to these two stations as to the channels over which they will operate during the conversation.

For purposes of this description, the first channel identified, i.e., XXX, is assumed to be that over which the originating station is to transmit and the addressed station is to receive; and the second channel identified, i.e., YYY, is that on which the originating station is to receive and the addressed station is to transmit.

Participating station (routing equipment)

Referring to FIG. 2, line 50 indicates the 2-wire connection from a subscriber's telephone to an international exchange 54, and lines 56, 58 represent corresponding 4-wire connections between the exchange and the routing equipment of a participating station. For the calling subscriber, the line 50 represents the connection from that subscriber's telephone. For the called subscriber, this line represents the connection to the telephone of that party.

Connected across the lines 56, 58 is supervisory equipment 60, which may be conventional telephone supervisory and signaling equipment. From the originating station, the outgoing voice channel is transmitted over line 56, and the incoming voice channel is received over line 58. Accordingly, line 56 is indicated as connected to one of a number of channel modulators 62 for ultimate transmission via a transmitter 64. For received messages, the line 58 is indicated as connected to one of a number of channel demodulators 66 into which signals from a receiver 68 is fed.

At this point, it should be noted that each participating station is provided with a plurality of 4-wire connections and channel modulators and demodulators, the number depending upon the traffic-handling capacity for which the station is equipped. The respective lines 56 are connected to the channel modulators 62, and the respective lines 58 are connected to the demodulators 66. However, each channel modulator and demodulator can operate on any channel, i.e., each can be adjusted (e.g., tuned) for operation on a given channel in response to control signals. In the context of my invention, channels may be frequency channels, time slots, orthogonal channels, or such discrete channels as may be appropriate to common spectrum techniques.

Before telephone communication can be established, it is necessary for the originating station to transmit the necessary data to the routing center for obtaining channel assignments for transmission and reception by the two stations involved. To this end, each station is provided with routing equipment which includes means to identify itself when originating a call, and means by which to identify an incoming call as one intended for it.

To facilitate the desired operation, I provide at each station a data modulator 70, the output of which, together with the outputs of the channel modulators 62, is coupled to a combining network 72 that is connected to the transmitter 64. The data modulator 70 is coupled to the output of an identification inserter 76, which is a code pattern generator that stores the call letters Z′Z′Z′ of the particular station, and which is adapted to insert those call letters before the dial train of a call originating through the station. The identification inserter 76 may be a conventional magnetic register.

To the identification inserter 76 is coupled a transfer register 78, which is also coupled through a delay network 80 to a second register 82. A connection 84 to the second register 82 from the supervisory equipment 60 is provided for impressing the "proceed to send" signal from the supervisory equipment upon the second register. The second register 82 is also connected at 86 to the supervisory equipment 60.

The second register 82 is connected to a comparator 88, which may be a coincidence register, and such comparator 88 also has coupled thereto a Z-absorber 90, for which a digital register may be used. To the Z-absorber 90 is coupled a data demodulator 92, the input to which, along with the input to the channel demodulators 66, is fed from a distributing network 94 which receives the output of the receiver 68.

The data demodulator 92 is also coupled to a call letter decoder 96, which may be a coincidence register, and which has its output coupled to the transfer register 78. As indicated, the supervisory equipment 60 has an output connection 98 to the transfer register 78.

In addition to its connection to the comparator 88, the Z-absorber 90 is connected at 100 to a regional/area decoder 102, which may be a conventional matrix translator, and which is coupled to an absorber 104, which also may be a conventional matrix translator. The outputs of the comparator 88 and the B–C absorber 104 are coupled to a multiplex control logic network 106. The network 106 has respective connections 108, 110 to the channel modulators 62 and the channel demodulators 66.

Operations of participating stations (1) The originating station.—At the originating station, a subscriber (or operator) dialing through the international exchange 54 proceeds to dial the regional and area codes, followed by the exchange code and number of the telephone of a subscriber at another station. This dial train is transmitted through the supervisory equipment 60 and connection 98 to the transfer register 78.

The transfer register 78 holds the dial train until the call letters of the originating station are transmitted from the routing center and received at the originating station. Once such call letters are received by the receiver 68, they are processed through the distributing network 94 and data demodulator 92 to the call letter decoder 96. The call letters decoder 96 then triggers the transfer register 78, which transfers the dial train

BB–CCC–DD–NNNN into the identification inserter 76 where the call letters Z'Z'Z' are inserted. Through the data modulator 70 and combining network 72, this entire dial train modulates the transmitter 64, and the signal thus transmitted includes the originating station's call letters, followed by the dialing pulses, i.e.,

Z'Z'Z'–BB–CC–DD–NNNNN

As previously explained the routing center processes the information contained in this pulse train and retransmits it together with the channel assignment, i.e., assigning channels XXX–YYY for transmissian and reception as previously explained.

At the originating station, the entire pulse train is processed through the data demodulator 92 to the Z-absorber 90, which removes the call letters ZZZ, thus causing the pulse train

BB–CCC–DD–NNNNN–XXX–YYY to be applied to the comparator 88. It is also applied to the regional/area decoder 102, but the decoder does not respond inasmuch as the BB–CCC do not represent the regional/area codes of the originating station.

There are thus impressed upon the comparator 88 pulse trains from the Z-absorber 90 and the second register 82 which are identical, but with the addition of the channel assignment, XXX–YYY, added to one pulse train. This event signifies that it is the originating station's outgoing call, and the comparator thereupon passes the channel assignment portion of the pulse train to the multiplex control logic network 106. The network 106, in response to the channel assignment information from the comparator, operates through the connection 108 to cause an available channel modulator to select and operate on the appropriate transmit channel, XXX, for the transmission of voice information through the transmitter 64, and through the connection 110 to cause an available channel demodulator to select the appropriate receive channel, YYY, and demodulate the voice information from the addressed station.

In this latter connection, it will be noted that the multiplex control logic network 106 has a separate input to which the digital train, XXX–YYY, is applied from the comparator 88. In response, the network translates the information and develops a control signal at its output connection 108 which signifies that XXX is the transmit channel, and a control signal at its output connection 110 which signifies that YYY is the receive channel.

Attention is now directed to the two registers 78, 82 and the delay network 80 connected between them, which are provided to enable the routing equipment at an originating station simultaneously to hold the information of two calls—one for which a channel assignment has been requested, and the other for a succeeding call which requires a different channel assignment. The digital information of the first call is stored in the second register 82, and that of the second call is placed in the transfer register 78. The delay network 80 prevents the information from the transfer register 78 from being placed in the second register until some time after the channel assignment request has been made.

The delay is dictated by the transmission delay involved. As is apparent, there is a finite transmission delay for any call to the routing center, and a return transmission from the routing center of the requested channel assignment. Where transmissions are relayed through a stationary satellite—which is positioned 22,300 miles above the earth—the round trip delay is of the order of 0.55 second. The delay network 80 in such case is designed to delay by 0.55-sec. the transfer of information from the transfer register 78 to the second register 82. This allows time for the information in the second register 82 to be cleared and utilized before transfer thereto of the information in the transfer register 78.

When the channel modulators 62 and channel demodulators 66 in the two stations involved in a particular telephone call have selected the appropriate channels, the conventional incoming register (not shown) at the telephone exchange associated with the destination station is connected to the circuit in the conventional manner. This register causes a "proceed to send" signal to be emitted toward the originating station through the satellite. This signal is used by the supervisory equipment 60 of the originating station to cause its second register 82 to release the digital train therein to the supervisory equipment 60, which then applies this train to the appropriate channel modulator 62 for transmission to the destination station. At the destination station, this digital train is transmitted via line 58 to the incoming register at the telephone exchange, which establishes the connection to the called subscriber in accordance with conventional telephone practice.

(2) The addressed station.—At the addressed station, the same digital train, i.e.,

ZZZ–BB–CCC–DD–NNNNN–XXX–YYY is received and processed by the data demodulator 92. However, the call letter decoder 96 does not respond to the call letter portion of the dial train, inasmuch as that portion of the train does not represent the call letters of the addressed station. Therefore, the decoder 96 at the addressed station does not develop any output for triggering its transfer register 78.

The output of the Z-absorber 90 at the addressed station is the same as that at the originating station. However, since there is no pulse train in the second register 82 at the addressed station, the comparator 88 of that station does not have coincident inputs thereto, and hence does not pass any data to the multiplex control logic network 106.

However, further processing of the output of the Z-absorber 90 is effected through the connection 100, the regional/area decoder 102 and the absorber 104. In this connection, the decoder 102 is designed to pass only signals which are preceded by a pulse train which represents the addressed station's regional and area codes. Accordingly, the decoder 102 passes the pulse train to the absorber 104, which removes all but the pulse train representing the channel assignment, i.e., XXX–YYY.

This pulse train is applied to an input of the multiplex control logic network 106 which is separate from the input to which the comparator 88 is connected. In response, the network translates the information and develops a control signal at its output 108 which signifies that YYY is the transmit channel, and a control signal at its output 110 which signifies that XXX is the receive channel. Accordingly, the network 106 causes an available channel modulator to select and operate on the appropriate channel, YYY, and causes an available demodulator to select the appropriate receive channel, XXX.

Release of channels

When a call is terminated, the conventional "end of call" signal appears on the line 56 at the participating station, and is accordingly transmitted via satellite to the routing center. At the routing center the demultiplex equipment 12 separates the individual voice channels and the signal detectors and decoders 13 respond to the "end call" signal. Accordingly, when a call on an assigned channel is terminated, the demultiplex equipment 12 and the signal detectors an ddecoders 13 respond to the "end of call" signal to cause the status monitor 14 to restore to the channel status register the information of the released channels.

Back at the participating station, the supervisory equipment 60 operates from the lines 56 and 58 in a conventional manner to detect the termination of the call and to develop a terminating signal. The supervisory equipment applies the terminating signal to a separate input of the multiplex control logic network 106, which causes the channel modulators 62 and channel demodulators 66 to be restored to their inactive condition.

The demultiplex equipment 12 and the signal detectors and recoders 13 are not the only means embraced by my invention for detecting the release of channels by participating stations. For example, the routing equipment at each station may be adapted to transmit a pre-coded message whenever a call is terminated, indicating the channels released. In such case, the demuetiplex equipment 12 and the signal detectors and decoders 13 are eliminated, and a decoder for these special messages is provided between the data demodulator 11 and the status monitor 14. The status monitor 14 responds to the decoded messages to restore to the channel status register 18 the information of the released channels.

From the forgoing, it will be seen that my system is truly random in that access to any channel can be had by different stations at different times. However, such access is controlled so that not station can utilize a channel unless and until it receives an assignment thereof from the routing center. On the other hand, all channels are continuously monitored so that it is known which channels are presently available. Any available channel can thus be automatically assigned to any station in need thereof. The entire sequence of operations is automatic, and is controlled by established operating signals and procedures of existing terrestrial telephone systems.

While the system has ben described for use with a communication-satellite, and for having a particular mode of operation, my invention embraces a variety of uses, operations and modifications for the system described. For example, if time-division transmissions are employed, obviously each station is assigned predetermined time slots in which to transmit. In such case, the call letter absorbers and decoders 90, 96, and the call-up list register 34 may be eliminated if desired.

My invention obviously embraces any desired modulation scheme for the data and voice messages. Further, I contemplate the possible use of a combination of terrestrial and/or satellite transmissions. For example, digital data for channel requests and assignments may be transmitted between the routing center and the participating stations through terrestrial transmissions, while voice communication between participating stations is carried out via satellite. In such case, the delay network 80 may be eliminated.

My invention is also suitable as an all-terrestrial system. In such case, the common repeater may be stationed on land, to service a plurality of participating stations in different areas of the same country. Such a system serves as an addition to the existing telephone system, but is still controlled through the established operating procedures.

From the foregoing, it will be apparent that the system shown and described herein can be modified without departing from the spirit and scope of my invention as embraced by the appended claims.

I claim:

1. A controlled random multiple access communication system comprising:

a plurality of stations each having a transmitter and receiver operable on any of a plurality of signal channels;

a routing center for identifying those channels which are available at any instant for transmission and reception;

means at each station for effecting transmission to said routing center of a first signal train requesting a channel assignment and containing informatioin serving to identify the originating and addressed stations;

means at the routing center responsive to the first signal train to transmit a second signal train which represents a channel assignment;

and respective means at the requesting and addressed stations responsive to the second signal train to effect their transmission and reception in accordance with the channel assignment.

2. A system as defined in claim 1, wherein the second signal train identifies a pair of signal channels on which the requesting and addressed stations are to operate;

means at the requesting station responsive to the second signal train to set its transmitter for operation on one and its receiver for operation on the other of said pair of signal channels;

and means at the addressed station responsive to the second signal train to set its receiver for operation on said one and its transmitter for operation on said other of said pair of signal channels.

3. A system as defined in claim 2, including a repeater through which transmissions between stations are relayed.

4. A system as defined in claim 3 wherein said repeater also relays signal train transmissions to and from said routing center.

5. A system as defined in claim 3, wherein the means for effecting transmission of the first signal train includes a circuit connection from a telephone exchange; and means for modulating the station transmitter in accordance with information from said circuit connection to provide the first signal train.

6. A system as defined in claim 5, wherein said routing center includes a receiver for the first signal train and transmissions on signal channels currently in use;

monitoring means responsive to the transmissions on signal channels currently in use to store information of the signal channels currently in use and currently available for use;

means responsive to the first signal train and to the stored information to develop the second signal train;

a transmitter included in said means for transmitting the second signal train;

and means for modulating said transmitter with the second signal train.

7. A system as defined in claim 6, wherein said means responsive to the first signal train includes a demodulator for the first signal train;

a buffer distributor coupled to said demodulator for storing the first signal train;

allotter means coupled to said monitoring means;

means for effecting transfer of the first signal from the distributor to said allotter means;

means for effecting transfer from said monitoring means to said allotter means of a pulse train representing two available signal channels;

and means for connecting said allotter means to said means for modulating said transmitter.

8. A system as defined in claim 7, wherein the means of the requesting station responsive to the second signal train means a demodulator for the second signal train coupled to the station receiver;

a channel modulator connected to said circuit connection;

a channel demodulator;

a second circuit connection for connecting said demodulator to the telephone exchange;

and means for setting said channel modulator for operation on one of the assigned channels and for setting said channel demodulator for operation on the other of the assigned channels.

9. A system as defined in claim 6, wherein the addressed station includes:

circuit connections to and from a telephone exchange to which a subscriber's telephone is connected;

a data demodulator for the second signal train;

a channel modulator and a channel demodulator coupled to the respective circuit connections to and from the telephone exchange;

and means responsive to the second signal train to set the channel modulator for operation on said other of the assigned channels and to set the channel demodulator for operation on said one of the assigned channels.

10. A system as defined in claim 9, wherein said means for setting the channel modulator and demodulator of the requesting station includes a multiplex control logic network coupled to such modulator and demodulator, said network having a first input for the pulse train representing the assigned channels;

and means for effecting operation of said network to set such channel modulator and demodulator.

11. A system as defined in claim 10, wherein supervisory equipment is associated with the requesting station;

a further input to said network for connection to the supervisory equipment;

register means coupled to the first-mentioned circuit connection of the requesting station for storing the first signal train;

and means for interconnecting said register means with the supervisory equipment to cause the first signal train to be applied from said register means to the supervisory equipment and to cause the supervisory equipment to apply a control signal to said further input, said network responding to the control signal to set the associated channel modulator and demodulator for operation, respectively, on said one signal channel and said other signal channel.

12. A system as defined in claim 9, wherein said means for setting the channel modulator and demodulator of the addressed station includes a multiplex control logic network coupled to such modulator and demodulator, said network having a second input for the pulse train representing the assigned channels;

and means for operating said network to set such channel modulator and demodulator.

13. A system as defined in claim 12, wherein the network operating means of the addressed station includes means coupled between said data demodulator and said second input to apply the channel representing portion of the second signal train to said second input, said network operating means responding to said portion to set the associated signal channel modulator and demodulator for operation, respectively, on said other signal channel and said one signal channel.

14. A system as defined in claim 10, wherein said register means includes a transfer register coupled to the associated data modulator and data demodulator, said transfer register also being connected to the first-mentioned circuit connection of the requesting station;

a second register interconnected with the associated supervisory equipment;

a delay network connected between said transfer register and said second register;

and a comparator coupled between the associated data demodulator and multiplex control logic network.

References Cited

UNITED STATES PATENTS

| | | |
|---|---|---|
| 3,110,773 | 11/1963 | Miller. |
| 3,141,928 | 7/1964 | Davey et al. |
| 3,173,996 | 3/1965 | Rypinski. |
| 3,314,051 | 4/1967 | Willcox et al. |
| 3,383,597 | 5/1968 | Battail et al. |

KATHLEEN H. CLAFFY, Primary Examiner

J. S. BLACK, Assistant Examiner

U.S. Cl. X.R.

179—15; 325—55